US012338656B2

(12) United States Patent
Huang

(10) Patent No.: US 12,338,656 B2
(45) Date of Patent: Jun. 24, 2025

(54) HEAVY DUTY LOCK CASE

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD, Tainan (TW)

( * ) Notice: Subject to any disclaimer, the term of this patent is extended or adjusted under 35 U.S.C. 154(b) by 342 days.

(21) Appl. No.: 18/150,919

(22) Filed: Jan. 6, 2023

(65) Prior Publication Data

US 2024/0200364 A1 Jun. 20, 2024

(30) Foreign Application Priority Data

Dec. 19, 2022 (TW) ................................. 111148666

(51) Int. Cl.

| | |
|---|---|
| ***E05B 59/00*** | (2006.01) |
| ***E05B 9/08*** | (2006.01) |
| ***E05B 15/04*** | (2006.01) |
| ***E05B 15/10*** | (2006.01) |
| ***E05B 17/20*** | (2006.01) |
| ***E05B 63/00*** | (2006.01) |
| *E05B 63/08* | (2006.01) |

(52) U.S. Cl.

CPC ................ *E05B 59/00* (2013.01); *E05B 9/08* (2013.01); *E05B 15/04* (2013.01); *E05B 15/108* (2013.01); *E05B 17/2003* (2013.01); *E05B 63/0017* (2013.01); *E05B 2015/0413* (2013.01); *E05B 63/08* (2013.01)

(58) Field of Classification Search

CPC ...... E05B 15/04; E05B 15/102; E05B 15/104; E05B 15/108; E05B 17/20; E05B 17/2003; E05B 17/2007; E05B 17/2026; E05B 17/2038; E05B 63/0017; E05B 63/08; E05B 59/00; E05B 9/08; E05B 2015/0413

See application file for complete search history.

(56) References Cited

U.S. PATENT DOCUMENTS 4,348,835 A 9/1982 Jones et al.
5,339,659 A * 8/1994 Guzzinati .............. E05C 9/045 70/120
5,678,870 A * 10/1997 Pelletier ................. E05B 55/12 292/169.16

(Continued)

FOREIGN PATENT DOCUMENTS

EP 3550528 A1 9/2019
KR 20210019168 A 2/2021

(Continued)

*Primary Examiner* — Kristina R Fulton
*Assistant Examiner* — Noah Horowitz
(74) *Attorney, Agent, or Firm* — Ying-Ting Chen; Law Office of Michael Chen

(57) ABSTRACT

A heavy duty lock case is mounted on a door and includes a latch coupled with a door frame for retaining the door in a closed position. An anti-theft latch can be operated to engage with the door frame. The latch cooperates with an anti-pick member to avoid the latch from being picked to disengage from the door frame when the door is in the closed position. When normally operated, an inner operating device or an outer operating device can be operated to disengage the latch from the door frame while disengaging the anti-theft latch from the door frame, permitting easy, convenient opening of the door.

13 Claims, 10 Drawing Sheets

(56) References Cited

U.S. PATENT DOCUMENTS 6,177,771 B1 1/2001 Kinzer et al.
6,302,456 B1 * 10/2001 Errani .................... E05B 59/00 70/109
6,454,324 B1 9/2002 Lewis et al.
6,634,140 B1 10/2003 Sellman
6,745,603 B1 6/2004 Shaw
6,786,006 B2 9/2004 Kowalczyk et al.
6,891,479 B1 5/2005 Eccleston
7,051,403 B2 5/2006 Homberg
7,061,197 B1 6/2006 Mullet et al.
7,068,179 B2 6/2006 Snell et al.
7,143,547 B2 12/2006 Liles, Jr.
7,234,201 B2 6/2007 Brown et al.
7,282,883 B2 10/2007 Mullet et al.
7,296,380 B2 11/2007 Backman
7,316,096 B2 1/2008 Houser et al.
7,418,800 B1 9/2008 Sellman
7,484,333 B2 2/2009 Houser et al.
7,497,486 B1 * 3/2009 Davis .................. E05B 15/0205 292/169.14
7,555,867 B2 7/2009 Liles, Jr.
7,717,155 B2 5/2010 Mullet
7,774,984 B2 8/2010 Hsu
7,836,738 B2 * 11/2010 Tien .................... E05B 65/1086 292/336.5
7,966,771 B2 6/2011 Bienek
8,109,038 B2 2/2012 Houser et al.
8,169,169 B2 5/2012 Hass et al.
8,248,005 B2 8/2012 Romer
8,359,790 B2 1/2013 Shin
8,382,008 B1 2/2013 Ricciardi et al.
8,390,219 B2 3/2013 Houser
8,393,054 B2 3/2013 Bienek
8,407,937 B2 4/2013 Houser
8,415,902 B2 4/2013 Burris et al.
8,434,268 B2 5/2013 Nixon
8,499,495 B2 8/2013 Houser et al.
8,547,046 B2 10/2013 Burris et al.
8,601,744 B2 12/2013 Wildforster et al.
8,695,277 B2 4/2014 Romer et al.
8,826,598 B2 9/2014 Ranaudo et al.
8,875,344 B2 11/2014 Salutzki et al.
8,904,710 B2 12/2014 Romer et al.
8,963,683 B2 2/2015 Romer
9,003,630 B2 4/2015 Hufen
9,045,927 B1 6/2015 Hoffberg
9,097,051 B2 8/2015 Hellwig
9,115,526 B2 8/2015 Houser et al.
9,121,217 B1 9/2015 Hoffberg
9,163,446 B2 10/2015 Houser et al.
9,181,744 B2 11/2015 Salutzki et al.
9,187,942 B2 11/2015 Wildforster
9,297,194 B2 3/2016 Bienek et al.
9,506,284 B2 11/2016 Braverman et al.
9,514,583 B2 12/2016 Zasowski et al.
9,631,412 B2 4/2017 Hellwig et al.
9,683,378 B2 6/2017 Houser et al.
9,695,620 B2 7/2017 Zasowski et al.
9,869,117 B2 1/2018 Houser et al.
9,995,076 B1 6/2018 Hoffberg
10,006,236 B2 6/2018 Hellwig et al.
10,024,094 B2 7/2018 Bell et al.
10,030,425 B2 7/2018 Zasowski et al.
10,030,426 B2 7/2018 Langenberg
10,077,591 B2 9/2018 Tass
10,180,023 B2 1/2019 Zasowski et al.
10,208,520 B2 2/2019 Long et al.
10,236,801 B2 3/2019 Dye et al.
10,253,540 B2 4/2019 Bell et al.
10,273,736 B2 4/2019 Hucker
10,280,670 B2 5/2019 Roberts
10,280,678 B1 5/2019 Rendon, Jr. et al.
10,304,272 B2 5/2019 Kvinge et al.
10,316,568 B2 6/2019 Langenberg et al.
10,344,502 B2 7/2019 McKibben et al.
10,415,301 B2 9/2019 Kuan
10,458,151 B1 10/2019 Shen
10,472,873 B2 11/2019 Ladha et al.
10,508,471 B2 * 12/2019 Chen ...................... E05B 59/00
10,559,151 B2 2/2020 Kvinge et al.
10,648,208 B2 5/2020 Eickhoff
10,704,310 B1 7/2020 Barbon et al.
10,704,313 B2 7/2020 Houser et al.
10,724,288 B2 7/2020 Baumgarte
10,844,644 B2 11/2020 Langenberg et al.
10,968,677 B2 4/2021 Hass
11,124,993 B2 * 9/2021 Liu ........................ E05B 9/105
11,124,997 B2 9/2021 Eickhoff
11,250,655 B2 2/2022 Shen
11,286,692 B2 * 3/2022 Lien .......................... E05B 9/02
11,377,874 B2 * 7/2022 Cheng ................. E05B 17/2003
11,384,569 B2 * 7/2022 Liu ........................ E05B 59/00
11,542,727 B2 1/2023 Hsu
11,544,979 B1 1/2023 Shen
11,851,913 B2 * 12/2023 Palmieri ................ E05B 63/14
2005/0154612 A1 7/2005 Smith et al.
2006/0244271 A1 11/2006 Hass
2007/0256362 A1 11/2007 Hansen
2009/0078011 A1 * 3/2009 Avni ........................ E05C 9/16 70/486
2010/0107495 A1 5/2010 Bourgeois et al.
2010/0315229 A1 12/2010 Shin
2013/0009785 A1 1/2013 Finn et al.
2013/0216438 A1 8/2013 Hill et al.
2014/0255252 A1 9/2014 Stratman et al.
2014/0282934 A1 9/2014 Miasnik et al.
2016/0220716 A1 8/2016 Childress et al.
2016/0348415 A1 12/2016 Baumgarte
2017/0328100 A1 11/2017 Eickhoff
2018/0334841 A1 11/2018 Langenberg et al.
2019/0043296 A1 2/2019 Baumgarte et al.
2019/0145138 A1 5/2019 Eickhoff
2019/0153764 A1 5/2019 Baumgarte
2019/0264486 A1 8/2019 Toloday et al.
2019/0319557 A1 10/2019 Dye et al.
2019/0338576 A1 11/2019 Wang
2019/0345738 A1 11/2019 McKibben et al.
2019/0383080 A1 12/2019 Barbon et al.
2020/0037142 A1 1/2020 Lofton
2020/0190885 A1 6/2020 Coleman
2020/0256108 A1 8/2020 Shetty et al.
2020/0327758 A1 10/2020 Ma et al.
2020/0372743 A1 11/2020 Miller et al.
2021/0012598 A1 1/2021 Giebat et al.
2021/0023248 A1 1/2021 Townsend et al.
2021/0056791 A1 2/2021 Shen
2021/0123287 A1 4/2021 Miller et al.
2021/0252179 A1 8/2021 Grinstead et al.
2021/0308311 A1 10/2021 Stewart et al.
2022/0307316 A1 9/2022 Soderqvist

FOREIGN PATENT DOCUMENTS

KR 20210033154 A 3/2021
WO 2021007588 A1 1/2021
WO 2021050616 A1 3/2021
WO 2021214134 A1 10/2021

* cited by examiner

HEAVY DUTY LOCK CASE

BACKGROUND OF THE INVENTION

The present invention relates to a heavy duty lock case and, more particularly, to a heavy duty lock case including an anti-theft latch which can retract from an anti-theft position to a non-anti-theft position while moving a latch to a retracted, unlatching position.

A lock case currently available on the market can be mounted inside a door and includes a latch and an anti-theft latch which can operate separately from the latch. The latch is coupled with a latch hole in a door frame around the door in a closed position, preventing opening of the door. The lock case is operatively connected to inner and outer operating devices which are mounted on two sides of the door. When the anti-theft latch is in a retracted, non-anti-theft position, the inner and outer operating devices can actuate the latch to move to a retracted, unlatching position permitting opening of the door. The anti-theft latch can be moved to an anti-theft position engaged with an anti-theft hole of the door frame through additional operation. When the anti-theft latch is in the anti-theft position, even if the inner and outer operating devices are used to move the latch to the unlatching position, the door is still restricted by the anti-theft latch and, thus, cannot be opened. In this case, even though a person at the indoor side intends to open the door, the person must move the anti-theft latch to the non-anti-theft position and operate the inner operating device to move the latch to the unlatching position for opening the door, causing inconvenience in use.

BRIEF SUMMARY OF THE INVENTION

To overcome the above drawback, in an aspect, the present invention provides a heavy duty lock case comprising:

- a case body;
- a latch movably coupled to the case body and movable between a latching position and an unlatching position;
- an anti-pick member pivotably mounted to the case body, wherein the anti-pick member is pivotable between an anti-pick position and a non-anti-pick position;
- an anti-pick latch movably coupled to the case body and operatively connected to the latch and the anti-pick member, wherein the anti-pick latch is movable between an extended position and a retracted position, wherein when the anti-pick latch is in the extended position, the anti-pick member remains in the non-anti-pick position, and wherein when the anti-pick latch is in the retracted position, the anti-pick member is pivotable to the anti-pick position; and
- a connecting member pivotably connected to the case body and operatively connected to the latch and the anti-pick member, wherein pivotal movement of the connecting member actuates the latch to move between the latching position and the unlatching position and is capable of actuating the anti-pick member to move between the anti-pick position and the non-anti-pick position, wherein when the latch is in the unlatching position, the anti-pick member is in the non-anti-pick position, and the anti-pick latch is in the extended position or the retracted position, wherein when the latch is in the latching position and the anti-pick latch is in the extended position, the latch is movable from the latching position to the unlatching position without pivoting the connecting member, wherein when the latch is in the latching position, the anti-pick latch is in the retracted position, and the anti-pick member is in the anti-pick position, the latch is prevented from moving from the latching position to the unlatching position, and wherein with the latch in the latching position, the anti-pick member in the retracted position, and the anti-pick member in the anti-pick position, when the connecting member pivots, the connecting member actuates the anti-pick member to move to the non-anti-pick position and then actuates the latch to move to the latching position.

By providing the anti-pick latch cooperating with the anti-pick member, when the door is not closed, the anti-pick member is retained in the non-anti-pick position, such that the door frame can press against the latch to move the latch to the unlatching position while closing the door. When the door is closed, the anti-pick member automatically pivots to the anti-pick position to prevent the latch from moving to the unlatching position when the latch is picked, thereby providing convenient use.

In an example, the connecting member further includes an unlatching arm and a push end, wherein the anti-pick member further includes a push face, wherein the latch further includes an interlocking member having a first actuating member, wherein the push end abuts the first actuating member, wherein when the anti-pick latch is in the retracted position, the push face abuts the unlatching arm, such that when the connecting member pivots, the unlatching arm presses against the push face to pivot the anti-pick member from the anti-pick position to the non-anti-pick position, the push end presses against the first actuating portion, thereby moving the latch from the latching position to the unlatching position.

The connecting member can interlock with the anti-pick member and the latch via the unlatching arm and the push end, such that when the connecting member pivots, the latch moves towards the unlatching position while the anti-pick member moves towards the non-anti-pick position. Thus, the latch can move to the unlatching position, providing convenient use.

In an example, the anti-pick member further includes a side and a stop portion protruding from the side, wherein the anti-pick member further includes an abutting portion protruding from the stop portion away from the side, wherein the latch further includes a protrusion, wherein the anti-theft latch further includes a first actuating end and a second actuating end, wherein when the anti-pick latch is in the extended position, the second actuating end abuts the abutting portion, the anti-pick member is in the non-anti-pick position, and the stop portion is located outside of a movement path of the protrusion, the latch is movable from the latching position to the unlatching position, wherein when the anti-pick member is in the anti-pick position, the second actuating end disengages from the abutting portion, the stop portion is on the movement path of the protrusion, preventing the latch from moving from the latching position to the unlatching position.

The anti-pick member cooperates with the protrusion of the latch via the stop portion. When the anti-pick member is in the anti-pick position, the stop portion is on the movement path of the protrusion, such that the latch in the latching position cannot be picked to move to the unlatching position, thereby retaining the door in the closed state and enhancing safety of the heavy duty lock case.

In an example, the connecting member further includes:

- a first portion having a coupling portion, wherein the push end is located on the first portion; and a second portion coupled with the coupling portion to pivot jointly, wherein the unlatching arm is located on the second portion, wherein when the first portion pivots, the second portion pivots together with the first portion.

In an example, the heavy duty lock case further comprises:

an anti-theft latch movably coupled with the case body, wherein the anti-theft latch includes a plurality of latch heads, wherein the anti-theft latch is movable between an anti-theft position and a non-anti-theft position;

an unlocking spring movably received in the case body and biasing the anti-theft latch towards the non-anti-theft position;

a slidable locking block movably received in the case body, wherein when the slidable locking block engages with the anti-theft latch, the slidable locking block retains the anti-theft latch in one of the anti-theft position and the non-anti-theft position, and wherein when the slidable locking block disengages from the anti-theft latch, the anti-theft latch is permitted to move to the anti-theft position and the non-anti-theft position; and an unlocking member pivotably received in the case body, wherein the unlocking member includes an actuating end interlocked with the slidable locking block and an interlocking end, wherein the connecting member further includes an unlocking arm abutting the interlocking end, wherein with the anti-theft latch in the anti-theft position and with pivotal movement of the connecting member actuating the latch to move towards the unlatching position, the unlocking arm presses against and pivots the unlocking member, the slidable locking block disengages from the anti-theft latch, and the unlocking spring biases the anti-theft latch to move to the non-anti-theft position.

By provision of the connecting member interlocking with the anti-pick member, the unlocking member, and the latch, when the outer operating device (which can interlock with the heavy duty lock case only when in an unlocked state) or the inner operating device to pivot the connecting member, the anti-pick member moves from the anti-pick position to the non-anti-pick position. The slidable locking block disengages from the anti-theft latch, the latch moves from the latching position to the unlatching position, and the anti-theft latch moves from the anti-theft position to the non-anti-theft position, providing excellent convenience in practical use.

In an example, the heavy duty lock case further comprises:

a locking operation device mounted to the case body, wherein the locking operation device includes a push block operatively connected to a lock core; and an unlatching rod including a push portion, a driven portion, and a coupling portion between the push portion and the driven portion, wherein the coupling portion is pivotably connected to the anti-theft latch, wherein when the anti-theft latch is in the anti-theft position, the driven portion of the unlatching rod is outside of a pivotal path of the push block, wherein when the anti-theft latch is in the non-anti-theft position, the driven portion of the unlatching rod is on the pivotal path of the push block, wherein with the anti-theft latch in the non-anti-theft position and the connecting member remained unmoved, when the locking core is unlocked and pivots in a first direction, the push block presses against the driven portion, such that the push portion presses against and actuates the interlocking member to move, thereby moving the latch from the latching position to the unlatching position, wherein with the anti-theft latch in the non-anti-theft position and with the connecting member remained unmoved, when the lock core is unlocked and pivots in a second direction reverse to the first direction, the push block actuates the slidable locking block to disengage from the anti-theft latch and moves the anti-theft latch from the non-anti-theft position to the anti-theft position, and wherein with the anti-theft latch in the anti-theft position and with the connecting member remains unmoved, when the locking core is unlocked and pivots in the first direction, the push block actuates the slidable locking block to disengage from the anti-theft latch and moves the anti-theft latch from the anti-theft position to the non-anti-theft position.

When using the locking operation device to pivot the unlatching rod, the push portion simultaneously presses against the latch and the anti-pick member, such that the anti-pick member pivots towards the non-anti-pick position while the latch is moving towards the unlatching position. This avoids door opening operation by the outer operating device or the inner operating device. As a result, the heavy duty lock case is easier in use.

In an example, the anti-theft latch further includes an extension portion. The case body further includes an end plate. When the anti-theft latch is in the anti-theft position, each of the plurality of latch heads extends through the end plate. The unlocking spring is disposed around one of the plurality of latch heads and between the end plate and the extension portion.

The unlocking spring is directly mounted around one of the plurality of latch heads and between the end plate and the extension portion. Thus, the volume of the heavy duty lock case is reduced, and the overall structure is simpler.

In an example, the heavy duty lock case further comprises:

a locking operation device mounted to the case body, wherein the locking operation device includes a push block interlocked with a lock core, wherein the anti-pick member includes a swaying end; and an unlatching rod pivotably received in the case body, wherein the unlatching rod includes a push portion and a driven portion, wherein the push portion is operatively connected to the latch and adjacent to the swaying end, wherein when the push block rotates and presses against the driven portion to pivot the unlatching rod, the push portion presses against and actuates the anti-pick member to pivot from the anti-pick position to the non-anti-pick position, thereby moving the latch from the latching position to the unlatching position.

In another aspect, the present invention provides a heavy duty lock case comprising:

a case body;

a latch movably coupled to the case body and movable between a latching position and an unlatching position;

a connecting member pivotably connected to the case body, wherein the connecting member includes an unlocking arm, wherein pivotal movement of the connecting member causes movement of the latch between the latching position and the unlatching position;

an anti-theft latch movably coupled to the case body and movable between an anti-theft position and a non-anti-theft position;

an unlocking spring disposed in the case body and biasing the anti-theft latch towards the non-anti-theft position;

a slidable locking block movably coupled with the case body, wherein when the slidable locking block engages with the anti-theft latch, the slidable locking block retains the anti-theft latch in one of the anti-theft position and the non-anti-theft position, and wherein when the slidable locking block disengages from the anti-theft latch, the anti-theft latch is permitted to move from the anti-theft position to the non-anti-theft position or from the non-anti-theft position to the anti-theft position; and an unlocking member pivotably received in the case body, wherein the unlocking member includes an interlocking end adjacent to the unlocking arm and an actuating end, wherein when the connecting member pivots and the latch moves from the latching position to the unlatching position while the anti-theft latch is in the anti-theft position, the unlocking arm of the connecting member presses against the interlocking end to pivot the unlocking member, the actuating end of the unlocking member actuates the slidable locking block to disengage from the anti-theft latch, the unlocking spring biases the anti-theft latch to move from the anti-theft position to the non-anti-theft position, and wherein when the connecting member pivots and the latch moves from the latching position to the unlatching position, the slidable locking block displaces to engage with anti-theft latch, thereby retaining the anti-theft latch in the non-anti-theft position.

By provision of the connecting member interlocking with the anti-pick member, the unlocking member, and the latch, when the outer operating device (which can interlock with the heavy duty lock case only when in an unlocked state) or the inner operating device to pivot the connecting member, the anti-pick member moves from the anti-pick position to the non-anti-pick position. The slidable locking block disengages from the anti-theft latch, the latch moves from the latching position to the unlatching position, and the anti-theft latch moves from the anti-theft position to the non-anti-theft position, providing excellent convenience in practical use.

In an example, the anti-theft latch further includes an extension portion and a plurality of latch heads extending from the extension portion. The case body further includes an end plate. When the anti-theft latch is in the anti-theft position, each of the plurality of latch heads extends through the end plate. The unlocking spring is disposed around one of the plurality of latch heads and between the end plate and the extension portion.

The unlocking spring is directly mounted around one of the plurality of latch heads and between the end plate and the extension portion. Thus, the volume of the heavy duty lock case is reduced, and the overall structure is simpler.

In an example, the heavy duty lock case further comprises:

a locking operation device mounted to the case body, wherein the locking operation device includes a push block interlocked with a lock core, wherein the extension portion of the anti-theft latch includes a recession, an anti-theft latching groove, and an actuating groove, wherein the slidable locking block further includes an engaging portion and a bottom end, wherein when the slidable locking block engages with the anti-theft latch, the engaging portion engages with one of the recession and the anti-theft latching groove, wherein when the slidable locking block disengages from the anti-theft latch, the engaging portion disengages from the recession and the anti-theft latching groove, wherein when the push block rotates, the bottom end of the slidable locking block is pressed to disengage the engaging portion from the recession and the anti-theft latching groove, the actuating groove is pressed, and the anti-theft latch moves to the anti-theft position or the anti-theft position; and a positioning spring disposed between the case body and the engaging portion, wherein the positioning spring biases the slidable locking block towards a position engaged with the anti-theft latch.

In an example, the heavy duty lock case further comprises an unlatching rod including a push portion, a driven portion, and a coupling portion between the push portion and the driven portion, wherein the coupling portion pivotably connected to the anti-theft latch, wherein when the anti-theft latch is in the anti-theft position, the driven portion of the unlatching rod is outside of a pivotal path of the push block, wherein when the anti-theft latch is in the non-anti-theft position, the driven portion of the unlatching rod is on the pivotal path of the push block, wherein with the anti-theft latch in the non-anti-theft position and the connecting member remained unmoved, when the locking core is unlocked and pivots in a first direction, the push block presses against the driven portion, such that the push portion presses against and actuates the interlocking member to move, thereby moving the latch from the latching position to the unlatching position, wherein with the anti-theft latch in the non-anti-theft position and with the connecting member remained unmoved, when the lock core is unlocked and pivots in a second direction reverse to the first direction, the push block actuates the slidable locking block to disengage from the anti-theft latch and moves the anti-theft latch from the non-anti-theft position to the anti-theft position, and wherein with the anti-theft latch in the anti-theft position and with the connecting member remains unmoved, when the locking core is unlocked and pivots in the first direction, the push block actuates the slidable locking block to disengage from the anti-theft latch and moves the anti-theft latch from the anti-theft position to the non-anti-theft position.

When using the locking operation device to pivot the unlatching rod, the push portion simultaneously presses against the latch and the anti-pick member, such that the anti-pick member pivots towards the non-anti-pick position while the latch is moving towards the unlatching position. This avoids door opening operation by the outer operating device or the inner operating device. As a result, the heavy duty lock case is easier in use.

In an example, the heavy duty lock further comprises:

a supporting portion disposed in the case body; and a return spring, wherein the connecting member further includes an extension arm, wherein the return spring is disposed between the extension arm and the supporting portion and biases the connecting member to thereby bias the latch to the latching position, wherein when the latch is in the latching position, the unlocking member abuts against the supporting portion, and the slidable locking block engages with the anti-theft latch.

In an example, the connecting member further includes:

a first portion having a coupling portion, wherein the push end is located on the first portion; and a second portion coupled with the coupling portion to pivot jointly, wherein the unlatching arm is located on the second portion, wherein when the first portion pivots, the second portion pivots together with the first portion.

The present invention will become clearer in light of the following detailed description of illustrative embodiments of this invention described in connection with the drawings.

Figure 1:
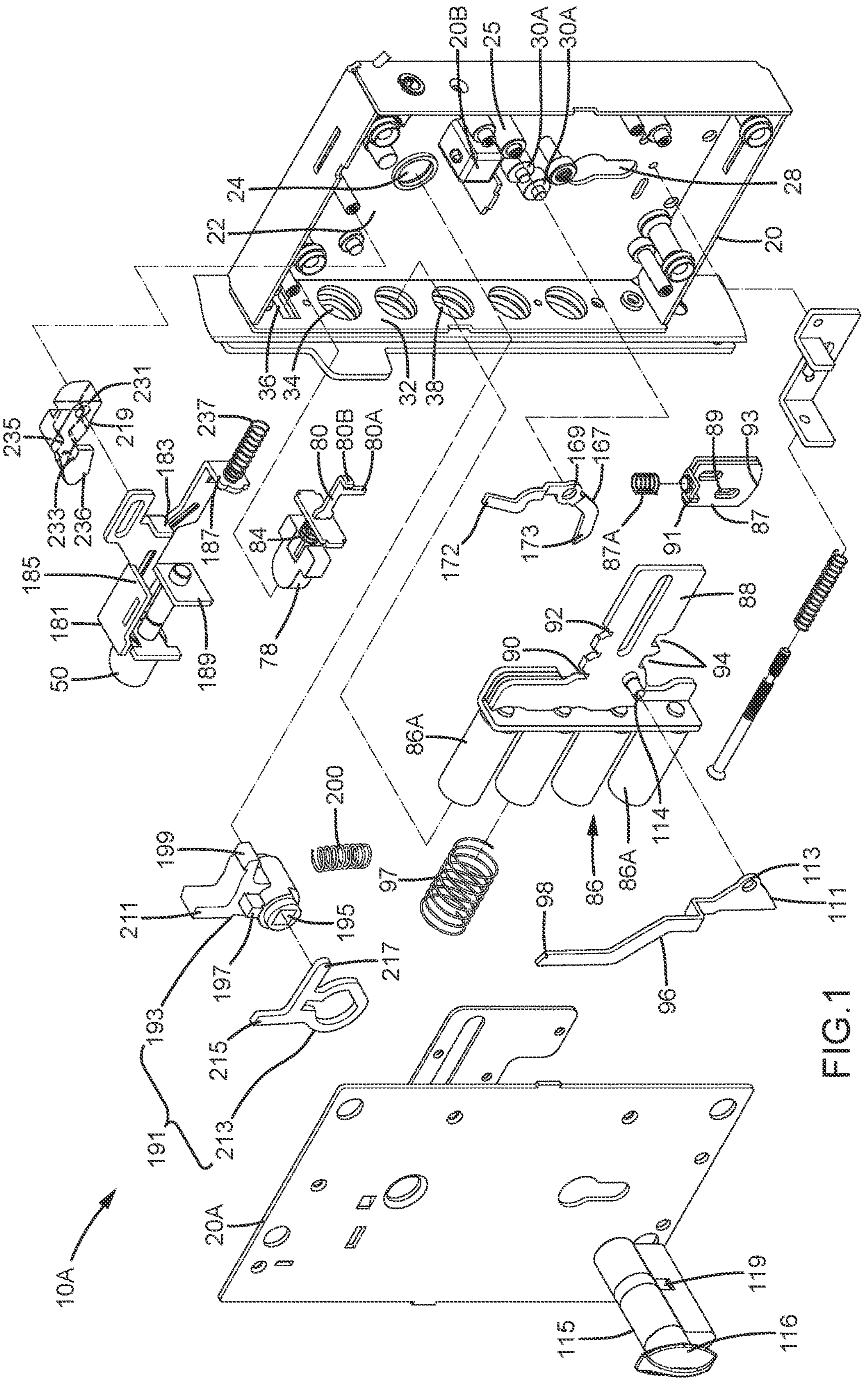
FIG. 1 is an exploded, perspective view of a heavy duty lock case of an embodiment according to the present invention.
Figure 2:
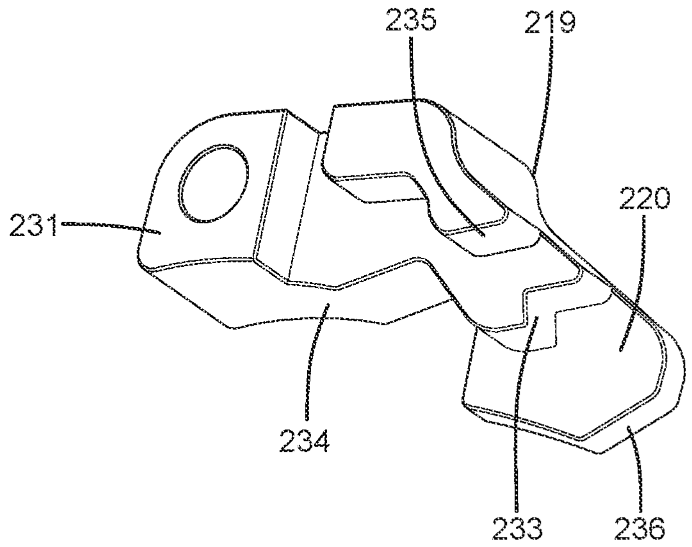
FIG. 2 is a bottom, perspective view of an anti-pick member of the heavy duty lock case of FIG. 1.
Figure 3:
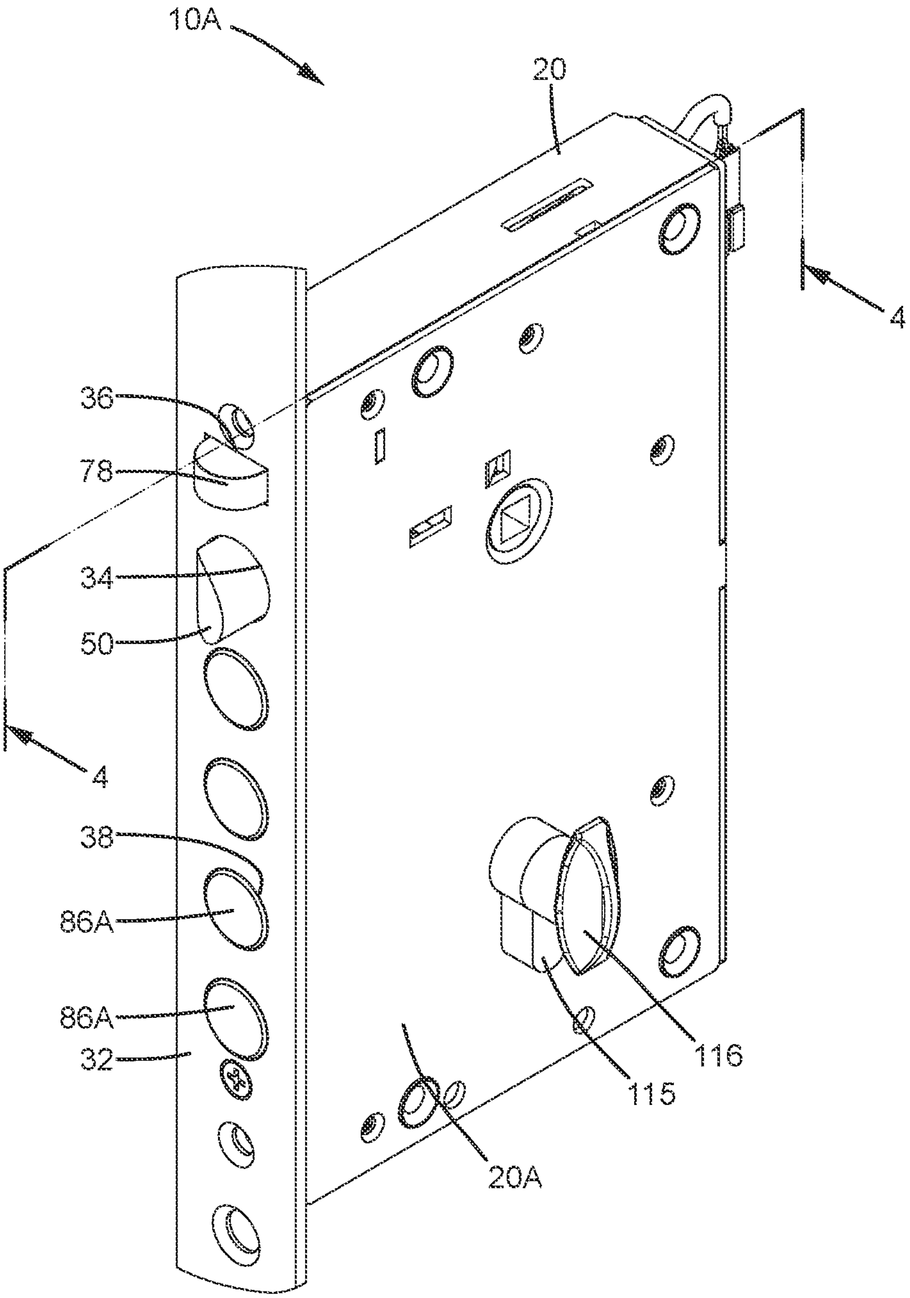
FIG. 3 is a perspective view of the heavy duty lock case of FIG. 1 after assembly.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “lower”, “upper”, “inner”, “outer”, “side”, “end”, “portion”, “axial”, “spacing”, “clockwise”, “counterclockwise”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

The present invention relates to a heavy duty lock case 10A which can be mounted in a door 130 to retain the door 130 in a closed position and which has a strength better than an ordinary lock case. With reference to FIGS. 1-4, the heavy duty lock case 10A includes a case body 20 having a bottom wall 22, an end plate 32 extending perpendicularly to the bottom wall 22, and a lid 20A opposite to the bottom wall 22. First and second pivotal portions 24 and 25 are formed on the bottom wall 22 and spaced from each other. The first pivotal portion 24 can be in the form of a cylindrical hole, and the second pivotal portion 25 can be in the form of a cylinder. Two limiting members 30A and a lock core hole 28 are disposed on the bottom wall 22 of the case body 20. Each of the two limiting members 20A can be in the form of a cylinder. The case body 20 further includes a supporting portion 30B securely disposed on the bottom wall 20.

The end plate 32 includes a latch hole 34, an anti-pick latch hole 36, and a plurality of anti-theft latch holes 38. The latch hole 34 is located between the anti-pick latch hole 36 and the plurality of anti-theft latch holes 38.

The heavy duty lock case 10A further includes a latch 50 slidably mounted to the case body 20. The latch 50 includes an interlocking member 181. The interlocking member 181 includes a tail end 187, a first actuating portion 183, a second actuating portion 189, and a protrusion 185. The first actuating portion 183 is located between the tail end 187 and the second actuating portion 189 in a direction parallel to the movement direction of the latch 50.

Figure 9:
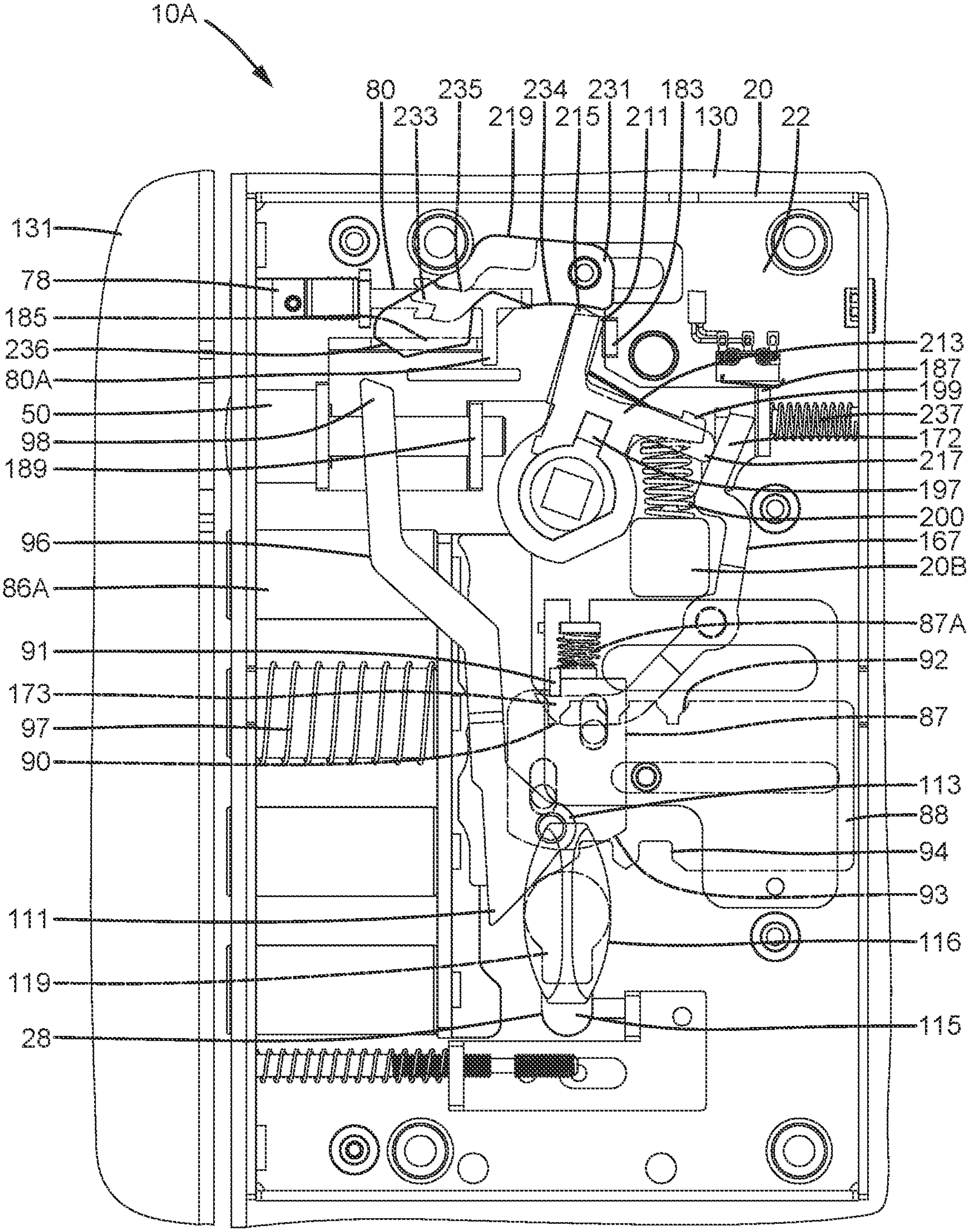
FIG. 9 is a cross sectional view similar to FIG. 8 with the connecting member pivoted, with the latch in the unlatching position, and with the anti-theft latch in an non-anti-theft position.
Figure 10:
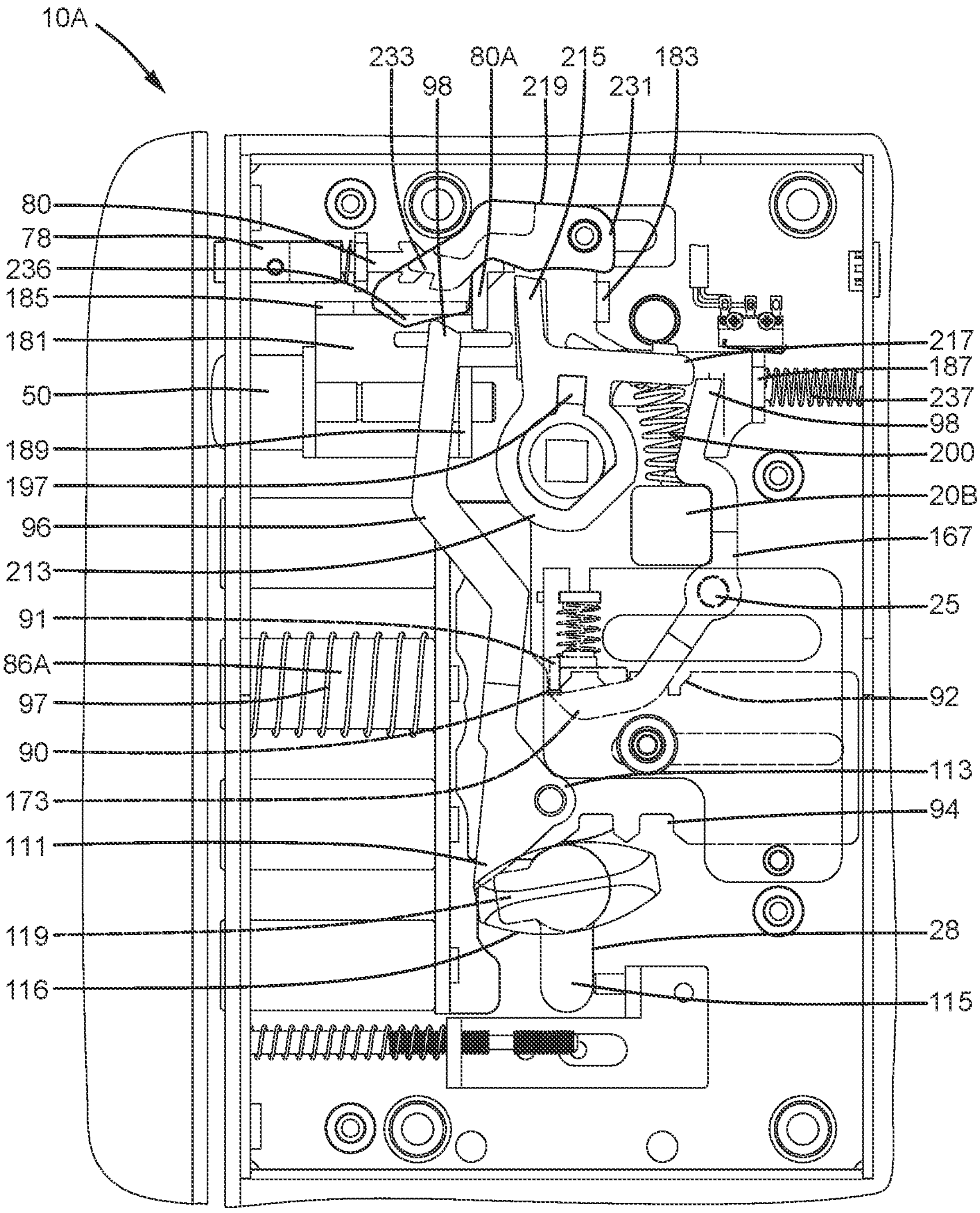
FIG. 10 is a cross sectional view of the heavy duty lock case with an unlatching rod pushed by pivotal movement of the locking operation device in a first direction to move the latch to the unlatching position.

The latch 50 slidably extends through the latch hole 34, and the interlocking member 181 slidably extends through the bottom wall 22, such that the latch 50 is movable in an axial direction of the latch hole 34 between a latching position (FIG. 3) and an unlatching position (FIGS. 9 and 10). The extent of the latch 50 in the latching position protruding beyond the end plate 32 is greater than that of the latch 50 in the unlatching position protruding beyond the end plate 32.

A biasing spring 237 is disposed between the tail end 187 of the latch 50 and the case body 20. The biasing spring 237 biases the latch 50 towards the latching position.

The heavy duty lock case 10A further includes a connecting member 191 pivotably connected to the case body 20. The connecting member 191 includes a first portion 193 and a second portion 213 which pivots together with the first portion 193. The first portion 193 may, but not limited to, be formed by powder metallurgy. The first portion 193 includes an extension arm 199 and a push end 211. The extension arm 199 and the push end 211 are spaced from each other in a circumferential direction about a pivotal axis of the first portion 193. The first portion 193 further includes a coupling portion 197 extending from a side thereof and a connecting hole 195 extending through the first portion 193 along the pivotal axis of the connecting member 191.

The second portion 213 includes an unlatching arm 215 and an unlocking arm 217. The unlatching arm 215 is spaced from the unlocking arm 217 in the circumferential direction about the pivotal axis of the connecting member 191. The second portion 213 is coupled with the coupling portion 197 of the first portion 193 to allow joint pivotal movement of the first portion 193 and the second portion 213. The unlatching arm 215 abuts the pus end 211. The unlocking arm 217 abuts the extension arm 199.

The first portion 193 of the connecting member 191 is pivotably connected to the case body 20. A return spring 200 is disposed between the extension arm 199 and the supporting portion 20B. The push end 211 abuts the first actuating portion 183 of the interlocking member 181. Thus, when the connecting member 191 pivots, the return spring 200 is compressed, and the push end 211 presses against the first actuating portion 183 of the interlocking member 81 to actuate the latch 50 to move between the latching position and the unlatching position.

The heavy duty lock case 10A further includes an anti-pick member 219 pivotably connected to the case body 20. The anti-pick member 219 includes a swaying end 236 and a pivotal end 231 spaced from the swaying end 236. The anti-pick member 219 further includes a side 220 between the swaying end 236 and the pivotal end 231. The anti-pick member 219 further includes a stop portion 233 protruding from the side 220 and an abutting portion 235 protruding from an outer side of the stop portion 233 away from the side 220. The anti-pick member 219 further includes a push face 234 formed on a lower side thereof and contiguous to the side 220 and the pivotal end 231.

Figure 4:
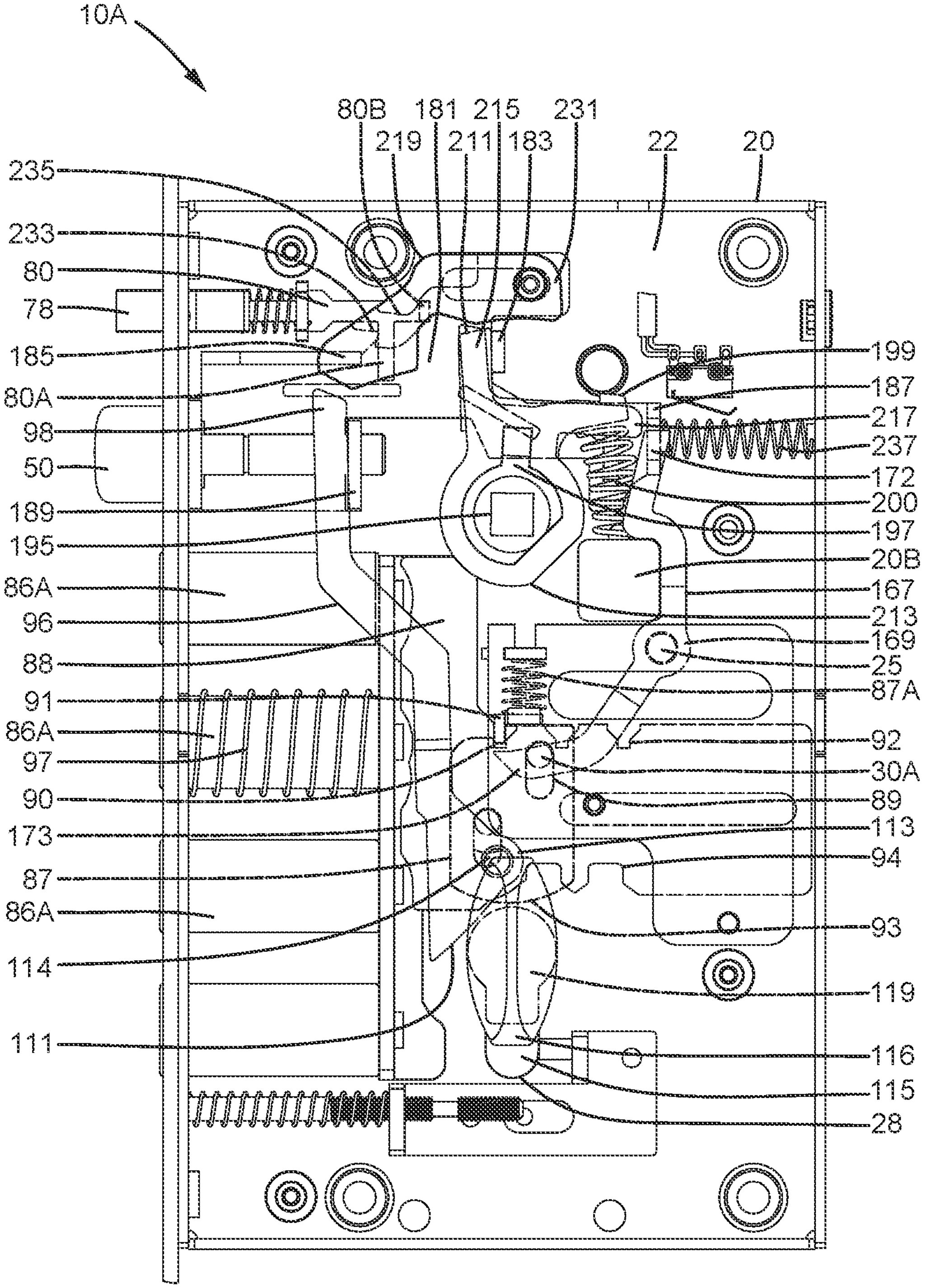
FIG. 4 is a cross sectional view taken along section line 4-4 of FIG. 3.

The pivotal end 231 of the anti-pick member 219 is pivotably connected to the case body 20. The stop portion 233 is adjacent to the protrusion 185 of the latch 50. The push face 234 is adjacent to the unlatching arm 215 of the connecting member 191. The anti-pick member 219 is pivotable about a pivotal axis defined by the pivotal end 231 and is pivotable between an anti-pick position (FIG. 5) and a non-anti-pick position (FIG. 4).

The heavy duty lock case 10A further includes an anti-pick latch 78 slidably coupled to the case body 20 and a supporting member 76. The supporting member 76 can be in the form of a piece fixed on the bottom wall 22 of the case body 20. The anti-pick latch 78 includes a follower member 80 having a first actuating end 80A and a second actuating end 80B. The follower member 80 is slidably coupled to the supporting member 76 and is slidably coupled with the anti-pick latch hole 36. The second actuating end 80B is adjacent to the abutting portion 235 of the anti-pick member 219. The anti-pick latch 78 is movable between an extended position (FIG. 4) and a retracted position (FIG. 5) in an axial direction of the anti-pick latch hole 36. An extent of the anti-pick latch 78 in the extended position protruding beyond the end plate 32 is greater than that of the anti-pick latch 78 in the retracted position protruding beyond the end plate 32. An anti-pick spring 84 is disposed between the anti-pick latch 78 and the supporting member 76 and biases the anti-pick latch 78 towards the extended position.

The heavy duty lock case 10A further includes a slidable locking block 87 slidably coupled to the case body 20. The slidable locking block 87 includes two sliding grooves 89 and a bottom end 93 below the two sliding grooves 89. The slidable locking block 87 further includes an engaging portion 91 spaced from the bottom end 93. The two limiting members 30A are slidably received in the two sliding grooves 89, assuring that the slidable locking block 87 can move rectilinearly relative to the case body 20. Furthermore, a positioning spring 87A is disposed between the engaging portion 91 of the slidable locking block 87 and the case body 20.

The heavy duty lock case 10A further includes an unlocking member 167 slidably coupled with the case body 20. The unlocking member 167 includes a main body 169, an interlocking end 172, and an actuating end 173.

The main body 169 of the unlocking member 167 is pivotably connected to the second pivotal portion 25. The actuating end 173 is adjacent to the engaging portion 91 of the slidable locking block 87. The interlocking end 172 of the unlocking member 167 is adjacent to the unlocking arm 217. Thus, pivotal movement of the connecting member 191 causes the unlocking arm 217 to press against the interlocking end 172, which, in turn, causes pivotal movement of the unlocking member 167. Furthermore, the interlocking end 173 of the unlocking member 167 presses against the engaging portion 91 to actuate the slidable locking block 87 to move.

The heavy duty lock case 10A further includes an anti-theft latch 86. The anti-theft latch 86 includes an extension portion 88 and a plurality of latch heads 86A extending from the extension portion 88. A recession 90 and an anti-theft latching groove 92 are formed on an upper side of the extension portion 88. An actuating groove 94 is formed on a lower side of the extension portion 88.

The anti-theft latch 86 is slidably received in the case body 20 and is slidably coupled with the plurality of anti-theft latch holes 38. The anti-theft latch 86 is movable between an anti-theft position (FIG. 7) and a non-anti-theft position (FIG. 4). An unlocking spring 97 is disposed between an outer periphery of one of the plurality of latch heads 86A and the end plate 32. The unlocking spring 97 biases the anti-theft latch 86 towards the non-anti-theft position. The slidable locking block 87 is located between the bottom wall 22 of the case body 20 and the extension portion 88 of the anti-theft latch 86. The engaging portion 91 of the slidable locking block 87 is disengagably coupled with the recession 90 or the anti-theft latching groove 92.

The heavy duty lock case 10A further includes an unlatching rod 96 pivotably received in the case body 20. The unlatching rod 96 includes a push portion 98 and a driven portion 111. The unlatching rod 96 further includes a coupling portion 113 between the push portion 98 and the driven portion 111.

The coupling portion 113 of the unlatching rod 96 is pivotably coupled with a pin 114. The pin 114 is coupled with the extension portion 88 of the anti-theft latch 86 to move therewith. Thus, an end of the unlatching rod 96 adjacent to the driven portion 111 moves jointly with the anti-theft latch 86. The push portion 98 of the unlatching rod 96 abuts the second actuating portion 189 of the latch 50. Thus, pivotal movement of the unlatching rod 96 causes the push portion 98 to push the second actuating portion 189 to thereby move the latch 50 from the latching position to the unlatching position.

The heavy duty lock case 10A further includes a locking operation device 115 having a pivotable push block 119. The locking operation device 115 further includes a knob 116 interlocked with the push block 119 and a lock core 117 received therein. The knob 116 can be actuated to drive the push block 119 to pivot. The push block 119 can be pivoted only after a key is used to unlock the lock core 117.

The locking operation device 115 is coupled with the lock core hole 28 of the case body 20. The knob 116 is located on an indoor side. The lock core 117 is located on an outdoor side. The push block 119 is aligned with the lower end 93 of the slidable locking block 87, the extension portion 88 of the anti-theft latch 86, and the driven portion 111 of the unlatching rod 96 in the axial direction of the lock core hole 28.

The heavy duty lock case 10A is mounted to an inner side of the door 130 pivotably mounted in a door frame 131, permitting the door 130 to pivot relative to the frame 131 to an open position and the closed position. Although not specifically shown, the heavy duty lock case 10A according to the present invention may be used together with currently available inner and outer operating devices which are operatively coupled with the connecting hole 195 of the connecting member 191. Furthermore, when the outer operating device is set to a locking state, the outer operating device cannot drive the connecting member 191 to pivot and, thus, cannot move the latch 50 to the unlatching position. Thus, before the outer operating device is unlocked, the door 130 cannot be opened from the outside by the outer operating device.

Now that the basic construction of the heavy duty lock case 10A of the present invention has been explained, the operation and some of the advantages of the heavy duty lock case 10A can be set forth and appreciated. In particular, for the sake of explanation, it will be assumed that the door 130 is not closed (see FIG. 4), and the latch 50 is in the latching position. The push end 211 of the connecting member 191 abuts against the first actuating portion 183 of the latch 50. The anti-pick latch 78 is in the extended position. Thus, the second actuating end 80B of the follower member 80 supports the abutting portion 235 of the anti-pick member 219. As a result, the anti-pick member 219 is retained in the non-anti-pick position, and the push face 234 is spaced from the unlatching arm 215 of the second portion 213 of the connecting member 191. The stop portion 233 is outside of the movement path of the protrusion 185, such that the latch 50 is permitted to move from the latching position to the unlatching position while the connecting member 191 and the unlatching rod 96 are not pivoted. Furthermore, the anti-theft latch 86 is in the non-anti-theft position, and the engaging portion 91 of the slidable locking block 87 is coupled with the recession 90 of the extension portion 88 of the anti-theft latch 86. Thus, the anti-theft latch 86 is retained in the non-anti-theft position. Furthermore, the driven portion 111 of the unlatching rod 96 is on the rotational path of the push block 119.

When the latch 50 is directly pressed to move towards the unlatching position while the door 130 is open and the anti-pick member 219 is in the non-anti-pick position, the latch 50 can move from the latching position to the unlatching position. Thus, when the door 130 pivots towards the closed position, the latch 50 is pressed by the door frame 131 and moves to the unlatching position. When the door 130 is completely closed, the biasing spring 237 returns the latch 50 to the latching position to engage with the door frame 131, thereby retaining the door 130 in the closed position.

Figure 5:
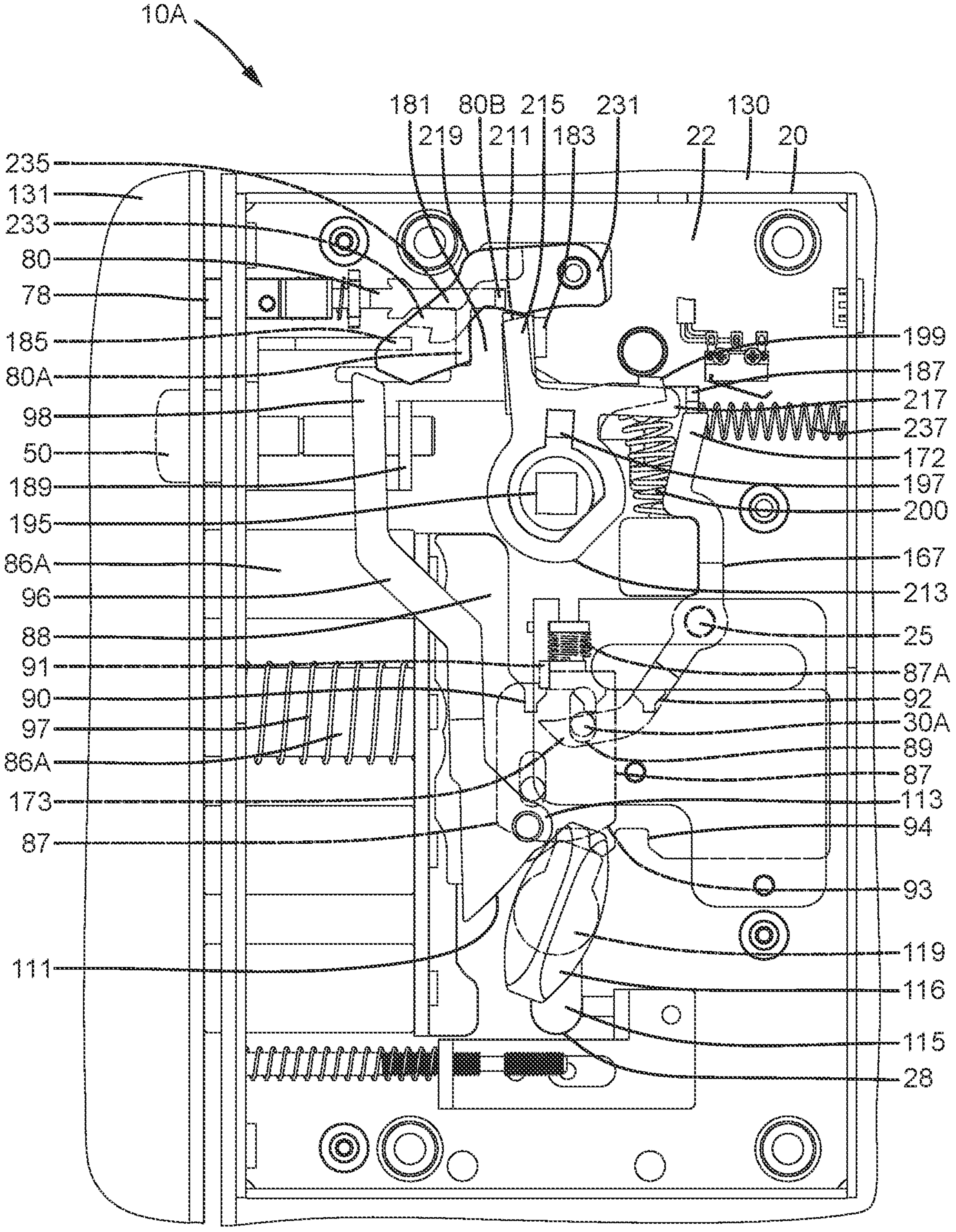
FIG. 5 is a cross sectional view of the heavy duty lock case mounted in a door in a closed position.

With reference to FIG. 5, with the door 130 in the closed state, the anti-pick latch 78 is pressed by the frame 131 to move from the extended position to the retracted position, such that the second actuating end 80B of the follower member 80 disengages from the abutting portion 235 of the anti-pick member 219. As a result, the anti-pick member 219 pivots from the non-anti-pick position to the anti-pick position under the action of the gravitational force. In this state, the push face 234 abuts against the unlatching arm 215 of the connecting member 191. Furthermore, the stop portion 233 of the anti-pick member 219 is on a path of the latch 50 from the unlatching position to the latching position.

In this state, when the outer operating device is set to the locking state, the outer operating device cannot be used to actuate the connecting member 191, such that the latch 50 of the heavy duty lock case 10A is retained in the latching position engaged with the door frame 131, preventing the door 130 from being opened from the outside.

Figure 7:
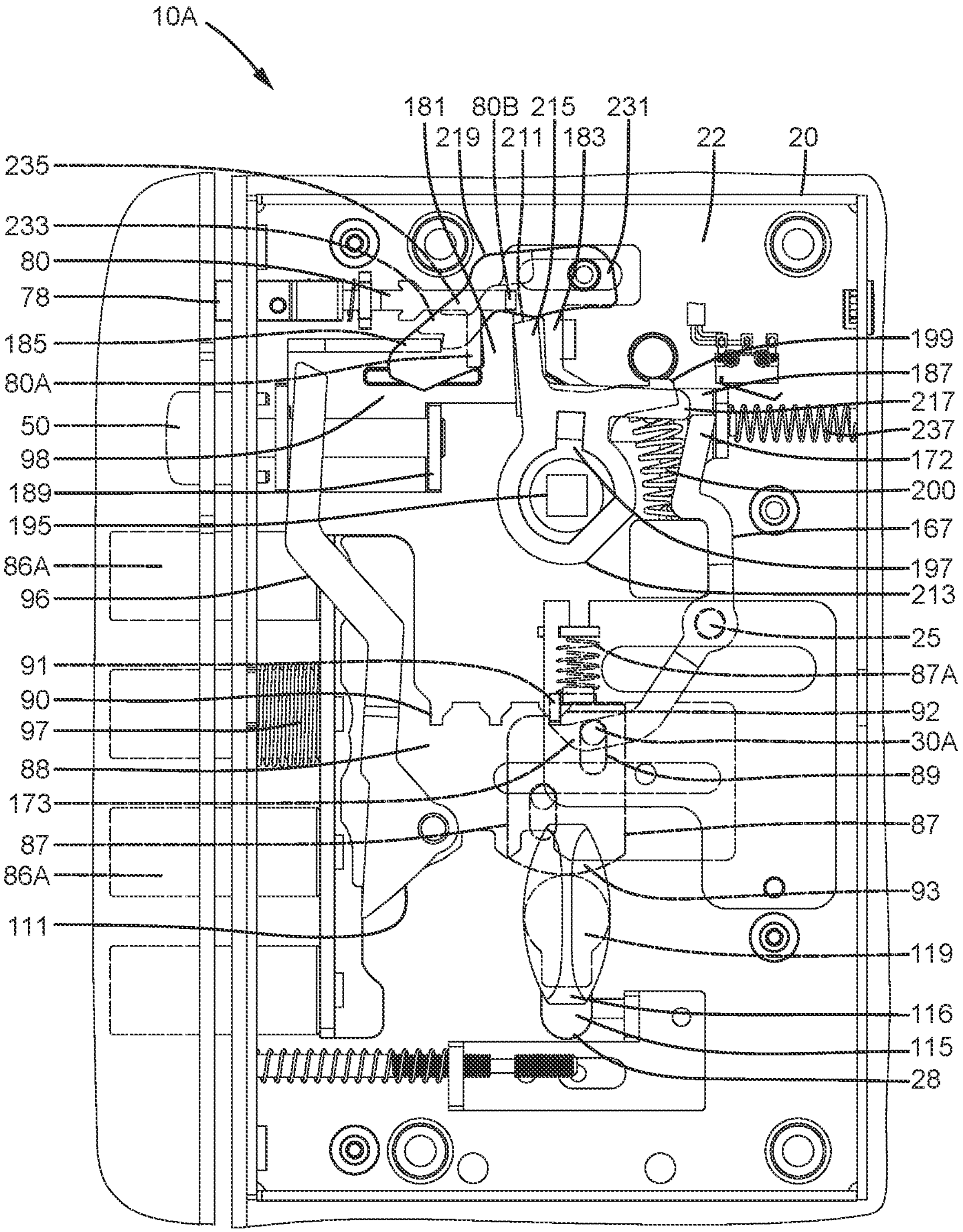
FIG. 7 is a cross sectional view of the heavy duty lock case illustrating an anti-picking mechanism when a latch is picked.

With reference to FIG. 7, in a case that a thief on the outside of the door 130 intends to pick the latch 50 via a gap between the door 130 and the door frame 131, after the latch 50 moves a small distance towards the unlatching position, the protrusion 185 of the interlocking member 181 abuts against the stop portion 233 of the anti-pick member 219, such that the latch 50 cannot move further to the unlatching position. In this state, the latch 50 still engages with the door frame 131, avoiding opening of the door 130 by directly picking the latch 50.

Figure 6:
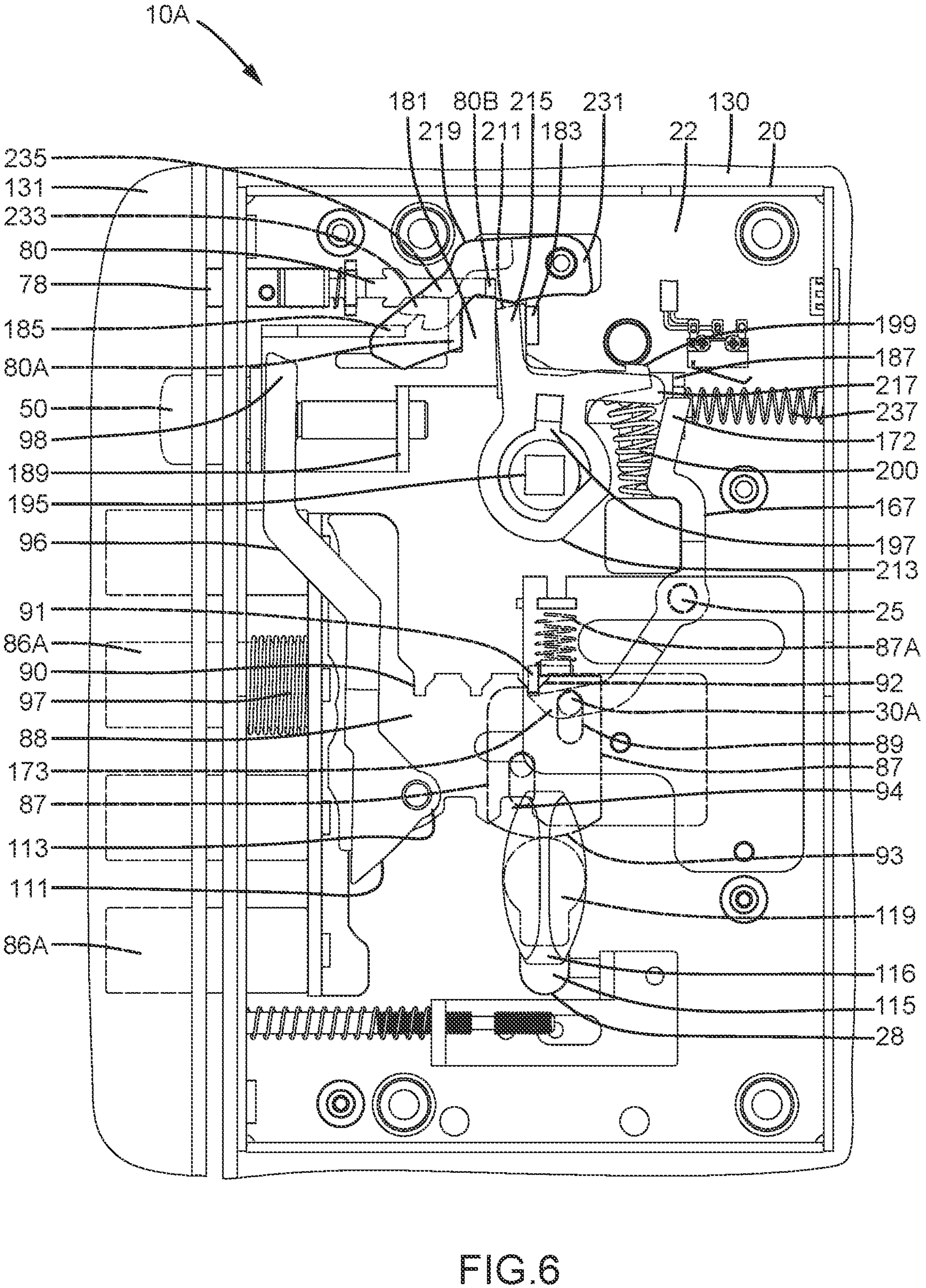
FIG. 6 is a cross sectional view similar to FIG. 5 with an anti-pick latch in an anti-pick position.

The anti-theft effect of the door 130 can be enhanced by moving the anti-theft latch 86 to the anti-theft position. Specifically, the knob 116 or the lock core 117 (which must be operated by a key) can be pivoted to move the push block 119 in the counterclockwise direction (a second direction). With reference to FIGS. 5 and 6, during the counterclockwise movement, the push block 119 firstly presses against the bottom end 93 of the slidable locking block 87. The slidable locking block 87 displaces and presses against the positioning spring 87A, causing disengagement of the engaging portion 91 from the recession 90. In this state, the anti-theft latch 86 is released and can displace. Further counterclockwise movement of the push block 119 presses against the actuating groove 94 of the extension portion 88, thereby pushing the anti-theft latch 86 from the non-anti-theft position to the anti-theft position.

It is worth noting that when the locking operation device 115 is used to move the anti-theft latch 86 from the non-anti-theft position to the anti-theft position, since the connecting member 191 remains unmoved, the unlocking member 167 also remains unmoved when the slidable locking block 87 moves.

With reference to FIG. 7, when the anti-theft latch 86 is in the anti-theft position, the distal end of the anti-theft latch 86 engages with the door frame 131. Furthermore, with the anti-theft latch 86 in the anti-theft position, the push block 119 can be further pivoted counterclockwise (the second direction) to its original position. When the anti-theft latch 86 reaches the anti-theft position, the slidable locking block 87 returns to its original position under the action of the positioning spring 87A. Thus, the engaging portion 91 engages with the anti-theft latching groove 92 of the anti-theft latch 86, thereby retaining the anti-theft latch 86 in the anti-theft position.

With reference to FIGS. 5 and 7, the spacing between the driven portion 111 of the unlatching rod 96 and the push block 119 while the anti-theft latch 86 is in the non-anti-theft position is smaller than the spacing between the driven portion 111 of the unlatching rod 96 and the push block 119 while the anti-theft latch 86 is in the anti-theft position. Specifically, as shown in FIG. 5, when the anti-theft latch 86 is in the non-anti-theft position, the driven portion 111 of the unlatching rod 96 is on the rotational path of the push block 119, such that clockwise movement of the push block 119 can press against the driven portion 111 to pivot the unlatching rod 96. As shown in FIG. 6, when the anti-theft latch 86 is in the anti-theft position, none of the clockwise movement (the first direction) and the counterclockwise movement (the second direction) of the push block 119 can press against the driven portion 111 of the unlatching rod 96.

When it is desired to move the anti-theft latch 86 from the anti-theft position to the non-anti-theft position, the knob 116 or the lock core 117 is moved to rotate the push block 119 in the clockwise direction (the first direction) without pressing against the driven portion 111 of the unlatching rod 96. Firstly, the push block 119 presses against the bottom end and moves the slidable locking block 87, and the engaging portion 91 disengages from the anti-theft latching groove 92. Then, the push block 119 pushes the anti-theft latch 86 to move from the anti-theft position (FIG. 6) to the non-anti-theft position (FIG. 5), thereby disengaging the anti-theft latch 86 from the door frame 131.

Figure 8:
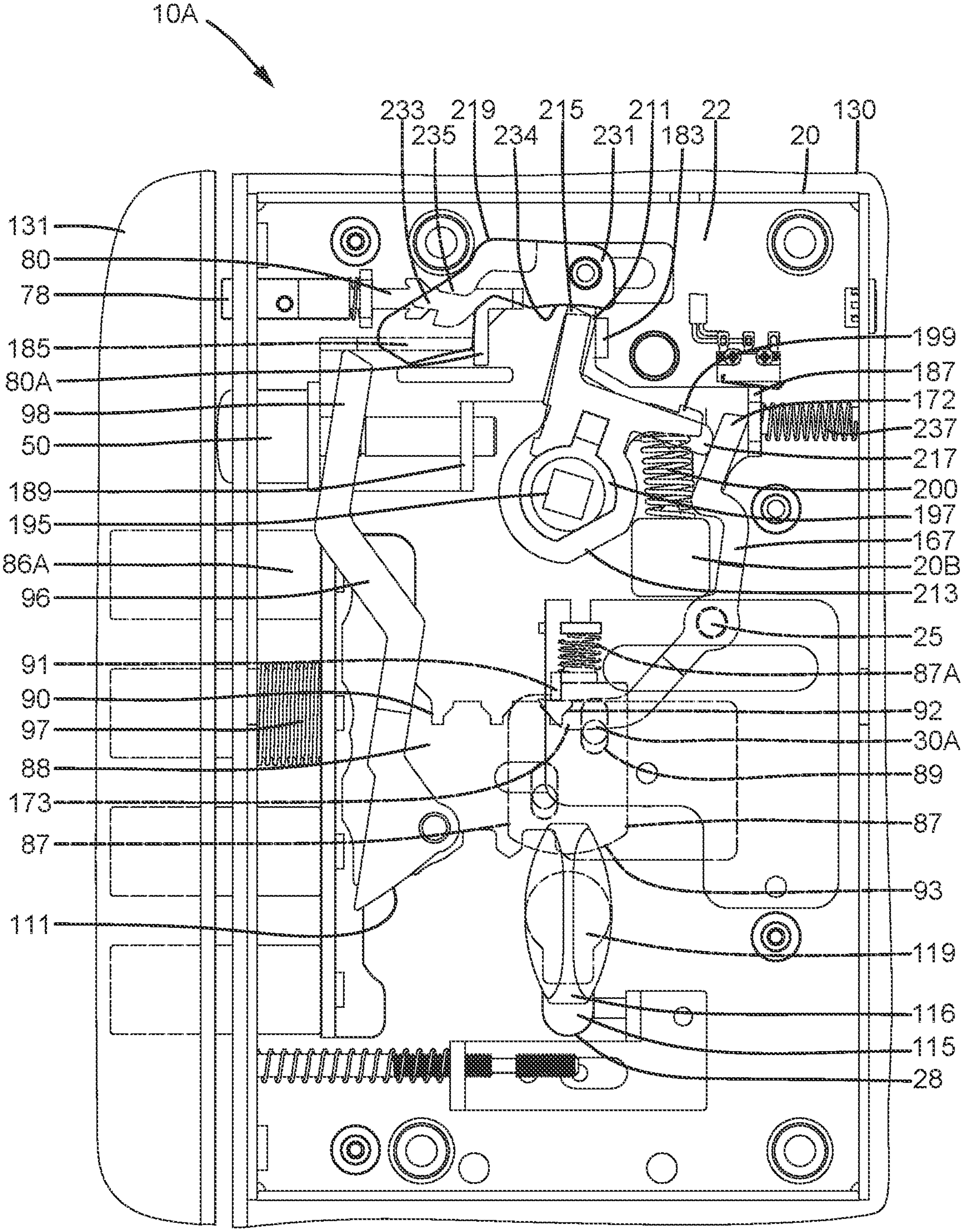
FIG. 8 is a cross sectional view of the heavy duty lock case with the anti-pick latch in the anti-pick position and with a connecting member initially pivoted.

With reference to FIGS. 6 and 8, with the door 130 closed and the anti-theft latch 86 in the anti-theft position, when it is desired to open the door 130 while the outer operating device is unlocked, the outer operating device or the inner operating device can be operated to drive the connecting member 191 to pivot in the clockwise direction. The push end 211 of the connecting member 191 presses against the first actuating portion 183, such that the latch 50 moves from the latching position (FIG. 6) to the unlatching position (FIG. 9). While the latch 50 is moving towards the unlatching position, the protrusion 185 presses against the first actuating end 80A, such that the anti-pick latch 78 also moves from the extended position to the retracted position.

At the first moment of the movement of the latch 50 towards the unlatching position, the unlatching arm 215 of the connecting member 191 presses against the push face 234 to pivot the anti-pick member 219 from the anti-pick position to the non-anti-pick position (FIGS. 8 and 9). At the same time, the unlocking arm 219 of the connecting member 191 presses against the interlocking end 172 to pivot the unlocking member 167, and the actuating end 173 presses against the engaging portion 91 to move the slidable locking block 87. Thus, the engaging portion 91 disengages from the anti-theft latching groove 92 (FIG. 8), and the unlocking spring 97 biases the anti-theft latch 86 from the anti-theft position (FIG. 6) to the non-anti-theft position (FIG. 9).

With reference to FIG. 4, when the inner or outer operating device is released after the door 130 is opened, the return spring 200 biases the extension arm 199 to return the connecting member 191 which pivots in the counterclockwise direction. Furthermore, the biasing spring 237 biases the latch 50 to return from the unlatching position to the latching position. The anti-pick spring 84 biases the anti-pick latch 78 to return from the retracted position to the extended position. The anti-pick member 219 is retained in the non-anti-pick position. The positioning spring 87A returns the slidable locking block 87 to engage the engaging portion 91 with the recession 90. As a result, the anti-theft latch 86 is retained in the non-anti-position.

Apart from using the inner or outer operating device to actuate the connecting member 191 for independently moving the latch 50 to the unlatching position or additionally moving the anti-theft latch 86 to the non-anti-theft position, the locking operation device 115 of the heavy duty lock case 10A can be used to cooperate with the unlatching rod 96 for moving the latch 50 to the unlatching position. With reference to FIG. 10, specifically, when the push block 119 pivots in the clockwise direction (the first direction) while the anti-theft latch 86 is in the non-anti-theft position, the push block 119 presses against the driven portion 111 of the unlatching rod 96, causing pivotal movement of the unlatching rod 96 about the pivotal axis defined by the pin 114. The push portion 98 of the unlatching rod 96 presses against the second actuating portion 189, causing movement of the latch 50 towards the unlatching position. At the same time, the push portion 98 of unlatching rod 96 presses against the swaying end 236 to pivot the anti-pick member 219 from the anti-pick position to the non-anti-pick position, such that the latch 50 moves to the unlatching position.

The anti-theft latch 86 can be moved from the anti-theft position to the non-anti-theft position by the locking operation device 115 in addition to the inner or outer operating device. Specifically, with reference to FIG. 7, with the anti-theft latch 86 in the anti-theft position, when the push block 119 is pushed in the clockwise direction (the first direction), the push block 119 firstly presses against the bottom end 93 to displace the slidable locking block 87, thereby disengaging the engaging portion 91 from the anti-theft latching groove 92. Further clockwise movement of the push block 119 presses against the actuating groove 94 to cause pivotal movement of the anti-theft latch 86 from the anti-theft position to the non-anti-theft position.

It is worth noting that since the inner operating device is generally mounted to the indoor side without the need of locking, the inner operating device is normally set in a state permitting direct operation for moving the latch 50 to the unlatching position while moving the anti-theft latch 86 to the non-anti-theft position. Meanwhile, the outer operating device mounted to the outdoor side cannot be used to interlock the heavy duty lock case 10A when the outer operating device is locked through an additional locking mechanism. Therefore, the heavy duty lock case 10A according to the present invention provides both convenience and excellent anti-theft effect.

By providing the anti-pick latch 78 cooperating with the anti-pick member 219, when the door 130 is not closed, the anti-pick member 219 is retained in the non-anti-pick position, such that the door frame 131 can press against the latch 50 to move the latch 50 to the unlatching position while closing the door 130. When the door 130 is closed, the anti-pick member 219 automatically pivots to the anti-pick position to prevent the latch 50 from moving to the unlatching position when the latch 50 is picked, thereby providing convenient use.

The connecting member 191 can interlock with the anti-pick member 219 and the latch 50 via the unlatching arm 215 and the push end 211, such that when the connecting member 211 pivots, the latch 50 moves towards the unlatching position while the anti-pick member 219 moves towards the non-anti-pick position. Thus, the latch 50 can move to the unlatching position, providing convenient use.

The anti-pick member 219 cooperates with the protrusion 185 of the latch 185 via the stop portion 233. When the anti-pick member 219 is in the anti-pick position, the stop portion 233 is on the movement path of the protrusion 185, such that the latch 50 in the latching position cannot be picked to move to the unlatching position, thereby retaining the door 130 in the closed state and enhancing safety of the heavy duty lock case 10.

By provision of the connecting member 191 interlocking with the anti-pick member 219, the unlocking member 167, and the latch 50, when the outer operating device (which can interlock with the heavy duty lock case 10A only when in an unlocked state) or the inner operating device to pivot the connecting member 191, the anti-pick member 219 moves from the anti-pick position to the non-anti-pick position. The slidable locking block 87 disengages from the anti-theft latch 86, the latch 50 moves from the latching position to the unlatching position, and the anti-theft latch 86 moves from the anti-theft position to the non-anti-theft position, providing excellent convenience in practical use.

When using the locking operation device 115 to pivot the unlatching rod 96, the push portion 98 simultaneously presses against the latch 50 and the anti-pick member 219, such that the anti-pick member 219 pivots towards the non-anti-pick position while the latch 50 is moving towards the unlatching position. This avoids door opening operation by the outer operating device or the inner operating device. As a result, the heavy duty lock case 10A is easier in use.

The unlocking spring 97 is directly mounted around one of the plurality of latch heads 86A and between the end plate 32 and the extension portion 88. Thus, the volume of the heavy duty lock case 10A is reduced, and the overall structure is simpler.

Now that the basic teachings of the present invention have been explained, many extensions and variations will be obvious to one having ordinary skill in the art. For example, the heavy duty lock case 10A does not have to include the anti-pick member 219. In this case, when the anti-theft latch 86 is in the anti-theft position, even if the latch 50 is picked to and moved to the unlatching position, the door 130 still cannot be opened.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A heavy duty lock case comprising:

a case body;

a latch movably coupled to the case body and movable between a latching position and an unlatching position;

an anti-pick member pivotably mounted to the case body, wherein the anti-pick member is pivotable between an anti-pick position and a non-anti-pick position;

an anti-pick latch movably coupled to the case body and operatively connected to the latch and the anti-pick member, wherein the anti-pick latch is movable between an extended position and a retracted position, wherein when the anti-pick latch is in the extended position, the anti-pick member remains in the non-anti-pick position, and wherein when the anti-pick latch is in the retracted position, the anti-pick member is pivotable to the anti-pick position;

a connecting member pivotably connected to the case body and operatively connected to the latch and the anti-pick member, wherein pivotal movement of the connecting member actuates the latch to move between the latching position and the unlatching position and is capable of actuating the anti-pick member to move between the anti-pick position and the non-anti-pick position, wherein when the latch is in the unlatching position, the anti-pick member is in the non-anti-pick position, and the anti-pick latch is in the extended position or the retracted position, wherein when the latch is in the latching position and the anti-pick latch is in the extended position, the latch is movable from the latching position to the unlatching position without pivoting the connecting member, wherein when the latch is in the latching position, the anti-pick latch is in the retracted position, and the anti-pick member is in the anti-pick position, the latch is prevented from moving from the latching position to the unlatching position, and wherein with the latch in the latching position, the anti-pick member in the retracted position, and the anti-pick member in the anti-pick position, when the connecting member pivots, the connecting member actuates the anti-pick member to move to the non-anti-pick position and then actuates the latch to move to the latching position;

an anti-theft latch movably coupled with the case body, wherein the anti-theft latch includes a plurality of latch heads, wherein the anti-theft latch is movable between an anti-theft position and a non-anti-theft position;

an unlocking spring movably received in the case body and biasing the anti-theft latch towards the non-anti-theft position;

a slidable locking block movably received in the case body, wherein when the slidable locking block engages with the anti-theft latch, the slidable locking block retains the anti-theft latch in one of the anti-theft position and the non-anti-theft position, and wherein when the slidable locking block disengages from the anti-theft latch, the anti-theft latch is permitted to move to the anti-theft position and the non-anti-theft position; and an unlocking member pivotably received in the case body, wherein the unlocking member includes an actuating end interlocked with the slidable locking block and an interlocking end, wherein the connecting member further includes an unlocking arm abutting the interlocking end, wherein with the anti-theft latch in the anti-theft position and with pivotal movement of the connecting member actuating the latch to move towards the unlatching position, the unlocking arm presses against and pivots the unlocking member, the slidable locking block disengages from the anti-theft latch, and the unlocking spring biases the anti-theft latch to move to the non-anti-theft position.

2. The heavy duty lock case as claimed in claim 1, wherein the connecting member further includes an unlatching arm and a push end, wherein the anti-pick member further includes a push face, wherein the latch further includes an interlocking member having a first actuating member, wherein the push end abuts the first actuating member, wherein when the anti-pick latch is in the retracted position, the push face abuts the unlatching arm, such that when the connecting member pivots, the unlatching arm presses against the push face to pivot the anti-pick member from the anti-pick position to the non-anti-pick position, the push end presses against the first actuating portion, thereby moving the latch from the latching position to the unlatching position.

3. The heavy duty lock case as claimed in claim 2, wherein the anti-pick member further includes a side and a stop portion protruding from the side, wherein the anti-pick member further includes an abutting portion protruding from the stop portion away from the side, wherein the latch further includes a protrusion, wherein the anti-pick latch further includes a first actuating end and a second actuating end, wherein when the anti-pick latch is in the extended position, the second actuating end abuts the abutting portion, the anti-pick member is in the non-anti-pick position, and the stop portion is located outside of a movement path of the protrusion, the latch is movable from the latching position to the unlatching position, wherein when the anti-pick member is in the anti-pick position, the second actuating end disengages from the abutting portion, the stop portion is on the movement path of the protrusion, preventing the latch from moving from the latching position to the unlatching position.

4. The heavy duty lock case as claimed in claim 3, wherein the connecting member further includes:

a first portion having a coupling portion, wherein the push end is located on the first portion; and a second portion coupled with the coupling portion to pivot jointly, wherein the unlatching arm is located on the second portion, wherein when the first portion pivots, the second portion pivots together with the first portion.

5. The heavy duty lock case as claimed in claim 1, further comprising:

a locking operation device mounted to the case body, wherein the locking operation device includes a push block operatively connected to a lock core; and an unlatching rod including a push portion, a driven portion, and a coupling portion between the push portion and the driven portion, wherein the coupling portion is pivotably connected to the anti-theft latch, wherein when the anti-theft latch is in the anti-theft position, the driven portion of the unlatching rod is outside of a pivotal path of the push block, wherein when the anti-theft latch is in the non-anti-theft position, the driven portion of the unlatching rod is on the pivotal path of the push block, wherein with the anti-theft latch in the non-anti-theft position and the connecting member remained unmoved, when the locking core is unlocked and pivots in a first direction, the push block presses against the driven portion, such that the push portion presses against and actuates the interlocking member to move, thereby moving the latch from the latching position to the unlatching position, wherein with the anti-theft latch in the non-anti-theft position and with the connecting member remained unmoved, when the lock core is unlocked and pivots in a second direction reverse to the first direction, the push block actuates the slidable locking block to disengage from the anti-theft latch and moves the anti-theft latch from the non-anti-theft position to the anti-theft position, and wherein with the anti-theft latch in the anti-theft position and with the connecting member remains unmoved, when the locking core is unlocked and pivots in the first direction, the push block actuates the slidable locking block to disengage from the anti-theft latch and moves the anti-theft latch from the anti-theft position to the non-anti-theft position.

6. The heavy duty lock case as claimed in claim 1, wherein the anti-theft latch further includes an extension portion, wherein the case body further includes an end plate, wherein when the anti-theft latch is in the anti-theft position, each of the plurality of latch heads extends through the end plate, wherein the unlocking spring is disposed around one of the plurality of latch heads and between the end plate and the extension portion.

7. The heavy duty lock case as claimed in claim 1, further comprising:

a locking operation device mounted to the case body, wherein the locking operation device includes a push block interlocked with a lock core, wherein the anti-pick member includes a swaying end; and an unlatching rod pivotably received in the case body, wherein the unlatching rod includes a push portion and a driven portion, wherein the push portion is operatively connected to the latch and adjacent to the swaying end, wherein when the push block rotates and presses against the driven portion to pivot the unlatching rod, the push portion presses against and actuates the anti-pick member to pivot from the anti-pick position to the non-anti-pick position, thereby moving the latch from the latching position to the unlatching position.

8. A heavy duty lock case comprising:

a case body;

a latch movably coupled to the case body and movable between a latching position and an unlatching position;

a connecting member pivotably connected to the case body, wherein the connecting member includes an unlocking arm, wherein pivotal movement of the connecting member causes movement of the latch between the latching position and the unlatching position;

an anti-theft latch movably coupled to the case body and movable between an anti-theft position and a non-anti-theft position;

an unlocking spring disposed in the case body and biasing the anti-theft latch towards the non-anti-theft position;

a slidable locking block movably coupled with the case body, wherein when the slidable locking block engages with the anti-theft latch, the slidable locking block retains the anti-theft latch in one of the anti-theft position and the non-anti-theft position, and wherein when the slidable locking block disengages from the anti-theft latch, the anti-theft latch is permitted to move from the anti-theft position to the non-anti-theft position or from the non-anti-theft position to the anti-theft position; and an unlocking member pivotably received in the case body, wherein the unlocking member includes an interlocking end adjacent to the unlocking arm and an actuating end, wherein when the connecting member pivots and the latch moves from the latching position to the unlatching position while the anti-theft latch is in the anti-theft position, the unlocking arm of the connecting member presses against the interlocking end to pivot the unlocking member, the actuating end of the unlocking member actuates the slidable locking block to disengage from the anti-theft latch, the unlocking spring biases the anti-theft latch to move from the anti-theft position to the non-anti-theft position, and wherein when the connecting member pivots and the latch moves from the latching position to the unlatching position, the slidable locking block displaces to engage with anti-theft latch, thereby retaining the anti-theft latch in the non-anti-theft position.

9. The heavy duty lock case as claimed in claim 8, wherein the anti-theft latch further includes an extension portion and a plurality of latch heads extending from the extension portion, wherein the case body further includes an end plate, wherein when the anti-theft latch is in the anti-theft position, each of the plurality of latch heads extends through the end plate, wherein the unlocking spring is disposed around one of the plurality of latch heads and between the end plate and the extension portion.

10. The heavy duty lock case as claimed in claim 9, further comprising:

a locking operation device mounted to the case body, wherein the locking operation device includes a push block interlocked with a lock core, wherein the extension portion of the anti-theft latch includes a recession, an anti-theft latching groove, and an actuating groove, wherein the slidable locking block further includes an engaging portion and a bottom end, wherein when the slidable locking block engages with the anti-theft latch, the engaging portion engages with one of the recession and the anti-theft latching groove, wherein when the slidable locking block disengages from the anti-theft latch, the engaging portion disengages from the recession and the anti-theft latching groove, wherein when the push block rotates, the bottom end of the slidable locking block is pressed to disengage the engaging portion from the recession and the anti-theft latching groove, the actuating groove is pressed, and the anti-theft latch moves to the anti-theft position or the anti-theft position; and a positioning spring disposed between the case body and the engaging portion, wherein the positioning spring biases the slidable locking block towards a position engaged with the anti-theft latch.

11. The heavy duty lock case as claimed in claim 10, further comprising an unlatching rod including a push portion, a driven portion, and a coupling portion between the push portion and the driven portion, wherein the coupling portion pivotably connected to the anti-theft latch, wherein when the anti-theft latch is in the anti-theft position, the driven portion of the unlatching rod is outside of a pivotal path of the push block, wherein when the anti-theft latch is in the non-anti-theft position, the driven portion of the unlatching rod is on the pivotal path of the push block, wherein with the anti-theft latch in the non-anti-theft position and the connecting member remained unmoved, when the locking core is unlocked and pivots in a first direction, the push block presses against the driven portion, such that the push portion presses against and actuates the interlocking member to move, thereby moving the latch from the latching position to the unlatching position, wherein with the anti-theft latch in the non-anti-theft position and with the connecting member remained unmoved, when the lock core is unlocked and pivots in a second direction reverse to the first direction, the push block actuates the slidable locking block to disengage from the anti-theft latch and moves the anti-theft latch from the non-anti-theft position to the anti-theft position, and wherein with the anti-theft latch in the anti-theft position and with the connecting member remains unmoved, when the locking core is unlocked and pivots in the first direction, the push block actuates the slidable locking block to disengage from the anti-theft latch and moves the anti-theft latch from the anti-theft position to the non-anti-theft position.

12. The heavy duty lock case as claimed in claim 8, further comprising:

a supporting portion disposed in the case body; and a return spring, wherein the connecting member further includes an extension arm, wherein the return spring is disposed between the extension arm and the supporting portion and biases the connecting member to thereby bias the latch to the latching position, wherein when the latch is in the latching position, the unlocking member abuts against the supporting portion, and the slidable locking block engages with the anti-theft latch.

13. The heavy duty lock case as claimed in claim 12, wherein the connecting member further includes:

a first portion having a coupling portion, wherein the push end is located on the first portion; and a second portion coupled with the coupling portion to pivot jointly, wherein the unlatching arm is located on the second portion, wherein when the first portion pivots, the second portion pivots together with the first portion.

* * * * *